(12) United States Patent
Askan

(10) Patent No.: US 8,705,110 B2
(45) Date of Patent: Apr. 22, 2014

(54) METHOD OF GENERATING A SMOOTH IMAGE FROM POINT CLOUD DATA

(76) Inventor: Yoldas Askan, Bedford (GB)

( * ) Notice: Subject to any disclaimer, the term of this patent is extended or adjusted under 35 U.S.C. 154(b) by 83 days.

(21) Appl. No.: 13/532,691

(22) Filed: Jun. 25, 2012

(65) Prior Publication Data

US 2013/0342877 A1   Dec. 26, 2013

(51) Int. Cl.
*G06K 15/00* (2006.01)
*G06F 3/12* (2006.01)

(52) U.S. Cl.
USPC ................. 358/1.18; 358/1.13; 358/1.14

(58) Field of Classification Search
USPC ............ 358/1.18, 1.13, 1.14; 345/422, 642
See application file for complete search history.

(56) References Cited

U.S. PATENT DOCUMENTS

| 7,990,397 B2 * | 8/2011 | Bukowski et al. ............. 345/642 |
| 8,451,473 B2 * | 5/2013 | Hong et al. ................... 358/1.14 |
| 2012/0314244 A1 * | 12/2012 | Kurihara ....................... 358/1.15 |

* cited by examiner

*Primary Examiner* — Charlotte M Baker
(74) *Attorney, Agent, or Firm* — Handal & Morofsky LLC

(57) ABSTRACT

A method is explained for processing an array of pixels in a point cloud. Local error bars are calculated for each pixel distance value. A difference is calculated between distance values of the pixel being processed and neighboring pixels with distance values within the error bars. If the difference is outside the error bars, the distance value of the pixel being processed is changed by a small fraction while remaining inside the error bars; if the difference is within the error bars, the pixel value is replaced by a weighted average. The neighboring pixels with distance values within the error bars of the pixel are counted and if a predetermined threshold is met, the counted values are averaged and replace the pixel value, but if not met, the pixel value is unchanged. If loop exit criteria have been met, the loop is terminated and if not, looping begins again.

11 Claims, 13 Drawing Sheets

METHOD OF GENERATING A SMOOTH IMAGE FROM POINT CLOUD DATA

TECHNICAL FIELD

The invention relates to apparatus and methods for generating, for example in three dimensions, a surface contour representation of a surface or portion thereof from a three dimensional scan file forming a point cloud data set.

CROSS REFERENCE TO RELATED APPLICATIONS (Not applicable).

STATEMENT REGARDING FEDERALLY SPONSORED RESEARCH OR DEVELOPMENT (Not applicable)

BACKGROUND OF THE INVENTION

Although 3D laser scanners are improving in quality, the point cloud scan files obtained from 3D scanners do not accurately represent the true dimensions of the actual object due to various types of noise such as statistical noise and false scatter points.

Laser scanner technicians have developed methods using registration markers in various forms or shapes known within the software of the laser scanner to aid in accurate measurement with little success. Even with the use of these objects, such as a sphere designed to be fully recognized by the scanner, the point cloud is not accurately represented and, instead, is distorted.

Aside from attempts to fine tune the laser scanners themselves, when tools designed to measure between scan points are utilized, they also fail to show the full expected field of view and oftentimes deviate by a significant amount.

It is recognized that some 3D images need smoothing in order to take accurate measurements of an object; however, these smoothing techniques distort and/or diminish the density of the original scan data. Other attempts do not rid the image of statistical noise to a high enough degree to be useful for small measurements. Another shortfall of typical 3D scans is the amount of scatter points and surface roughness included in scan files which mask the true shape of the object being measured. For example, if minute measurements are needed to monitor the deformation of an object to determine whether the structural integrity has been compromised for engineering purposes, this cannot be done to a high degree of certainty with various forms of noise present and, currently, the software and techniques for tuning the laser scanners do not provide adequate images.

SUMMARY OF THE INVENTION

In accordance with the invention, a method for processing an array of pixels in a point cloud, comprising calculating local error limits for each distance value for each pixel in the processed point cloud data set is provided. The method further comprises determining the error bar. One begins a distance value adjusting loop by for each pixel in the processed point cloud data set by calculating the difference between the distance value in the pixel of the point cloud data set being processed and each of the neighboring pixels or the most suitable neighboring pixel distance value is determined whether the difference is within the range defined by the error bar. If the difference is not within the error bar, the distance value is changed for the pixel being processed by a small fraction while keeping the new distance value within the range defined by the original distance value for the pixel being processed plus or minus the error bar. If the difference is within the error bar the distance value in the pixel being processed is replaced by a weighted average value. The number of neighboring pixels with their distance values within the error bar for the pixel being processed is counted and if the count is greater than a predetermined threshold, average the counted distance values and substitute the average for the pixel distance value, but if the count is below the threshold leave the pixel distance value unchanged. It is determined whether loop exit criteria have been met and if loop exit criteria have not been met beginning the loop again, and if loop exit criteria have been met, terminating the loop.

BRIEF DESCRIPTION THE DRAWINGS

The operation of the inventive method will become apparent from the following description taken in conjunction with the drawings, in which.

Figure 12:
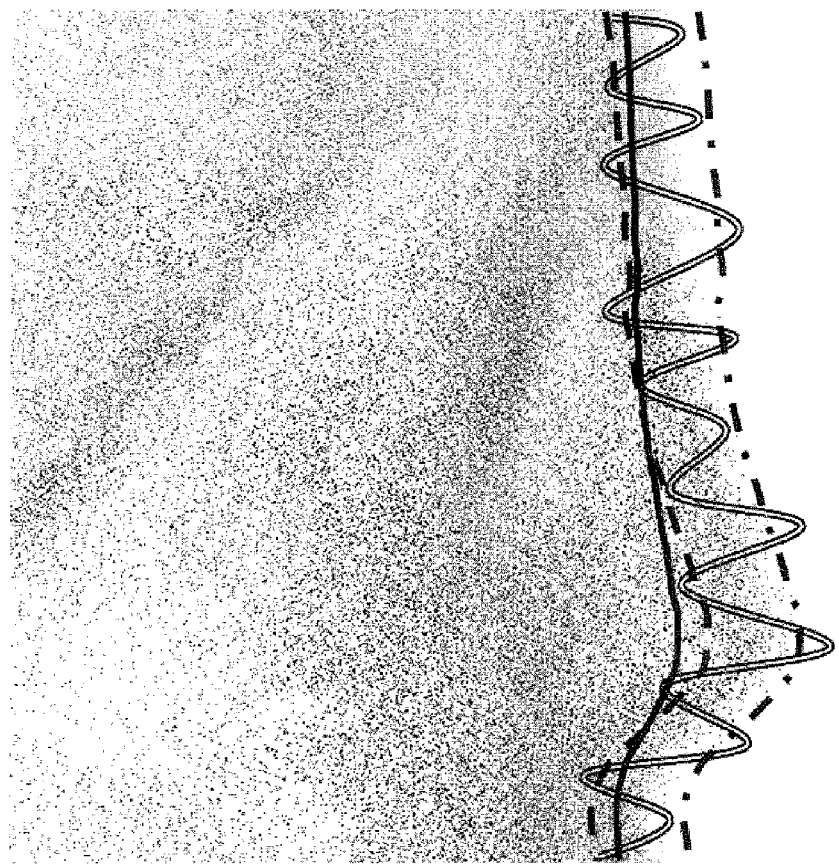
Figure 13:
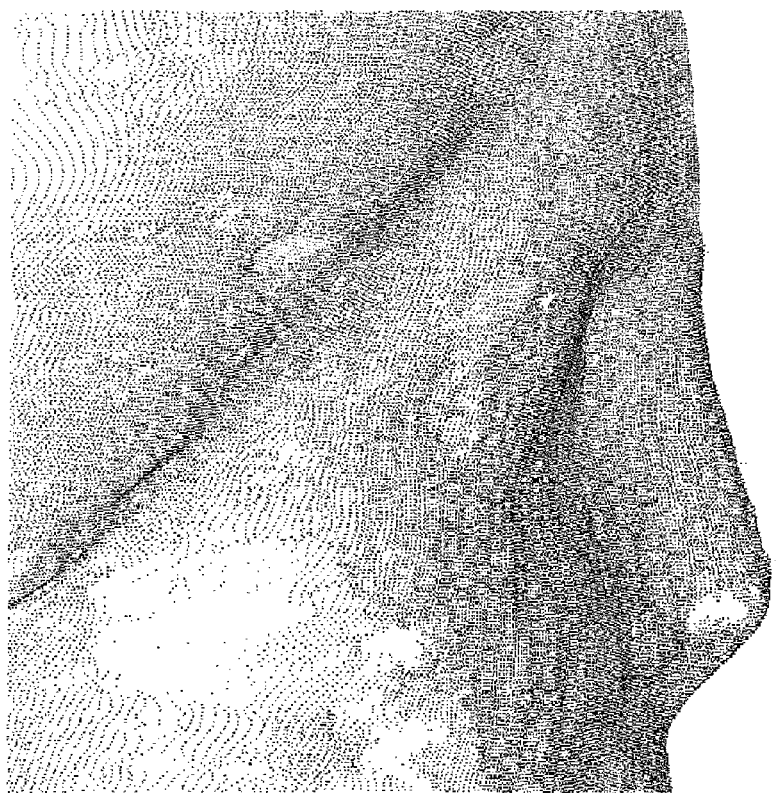

FIG. 12 is an image depicting the unedited, edited, and over-edited views of a statue nose using the Pixel Neighbor Repetitive Averaging function; and FIG. 13 is an edited point cloud of a close-up of a statue nose with the Scatter Points Deletions, the Compression of Minimum and Maximum Pixel Neighbor Distance Value, and Pixel Neighbor Repetitive Averaging methods applied without altering the density of the original scan file image.

DETAILED DESCRIPTION OF THE PREFERRED EMBODIMENTS

Figure 1:
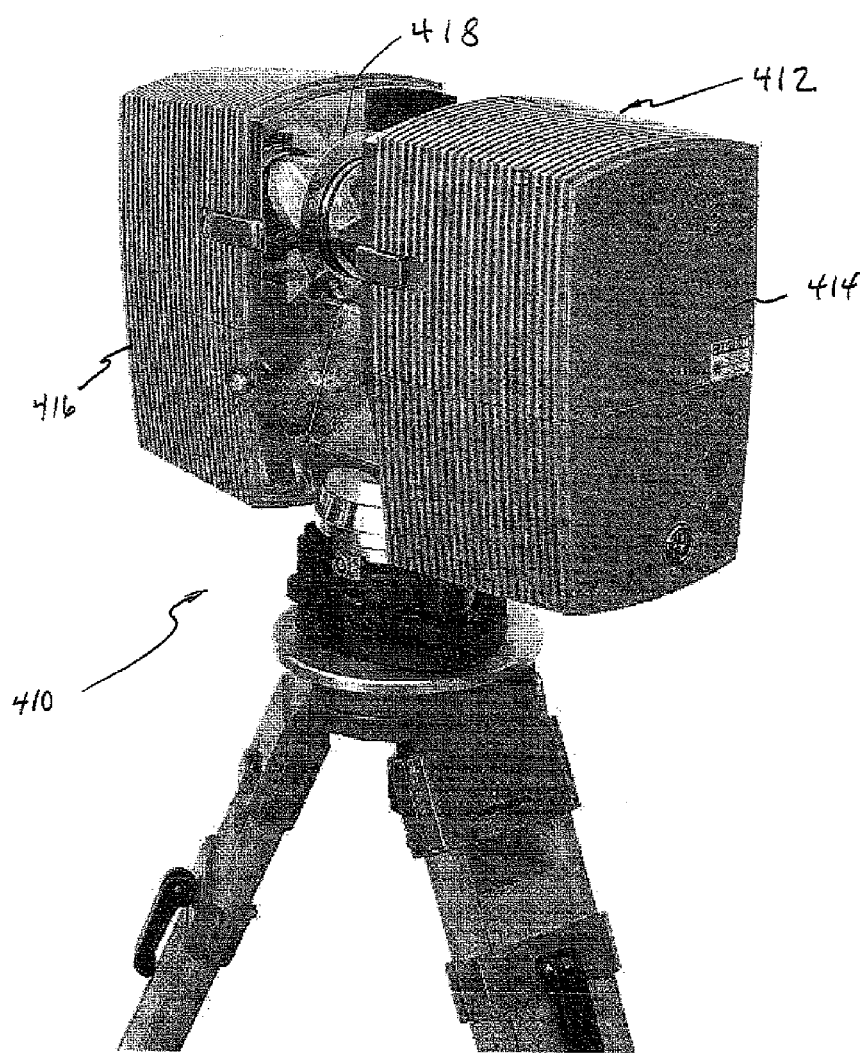
FIG. 1 is an image of the 3D spatial laser scanner.

Referring to FIG. 1, an image of a typical 3D spatial laser scanner 410 with a rotating head 414 comprised of two rectangular blocks 412 and 416 between which a wedged mirror 418 rotates is shown. The scanner aims a laser beam in a systematic mode of operation by the rotation of the head of the scanner in increments between two pan angle limits. The width of the scan field of view is obtained by the rotation of the head while the height of the scan field is obtained by a mirror that flips vertically. The distance value measurement is recorded as the distance between the origin of the laser and the surface of the first object within its path.

The systematic emission of millions of laser beams allows the 3D laser scanner to collate accurate measurement of distances to objects producing a 3D model often referred to as a "Point Cloud." A typical point cloud contains "noise" which constitutes scatter points and surface roughness. Scatter points, usually observed when the angle of incidence increases or decreases nearing the parallel values of the laser beam direction. Therefore, the presence of scatter points is at a minimum when the laser beam bounces off surfaces perpendicular to the laser beam direction. When a buildup of high noise data occurs, scatter points can exhibit new surfaces when this data fills out gaps between objects offset in 3D space.

Figure 2:
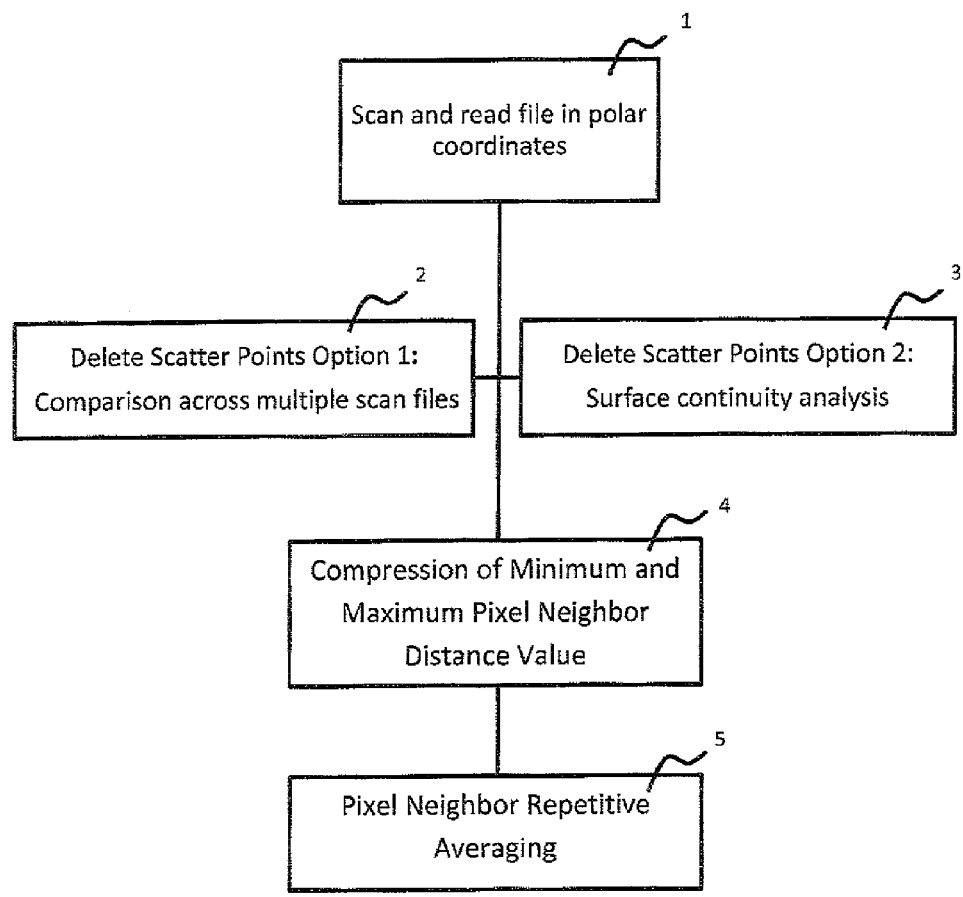
FIG. 2 is a flow chart of the Overall Noise Free and Smooth 3D Point Cloud Surface method.

Referring to FIG. 2, a flow chart depicting the overall scheme of the Noise Free, Smooth 3D Point Cloud Surface methodology is shown. For optimum results in many cases, methods 2-5 should be employed sequentially to delete scatter points and to produce an image with a smooth surface. In other instances, steps 2, 3, 4, and 5 can be utilized sequentially or non-sequentially and do not all have to be utilized based on the objective of the user.

Figure 9:
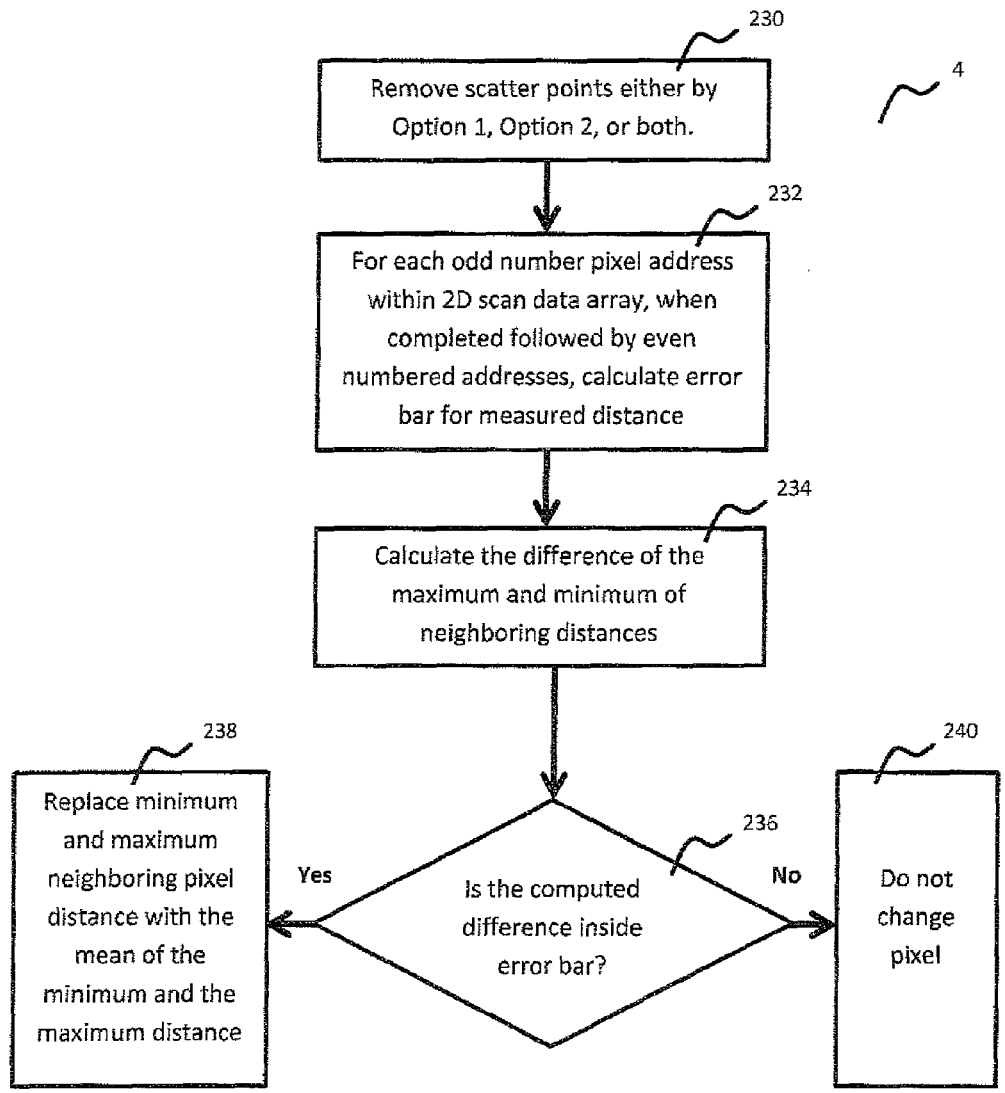
FIG. 9 is a flow chart depicting in detail the Compression of Minimum and Maximum Pixel Distance Value method.

At step 1, an object is scanned using a laser scanner or obtained as a file and read in polar coordinates. In step 2, Delete Scatter Points Option 1: Comparison across multiple scan files is employed. A detailed description of step 2 is explained in FIG. 5. In step 3, Delete Scatter Points Option 2: Surface continuity analysis is performed. A detailed description of step 3 is provided in FIG. 6. In step 4, the Compression of Minimum and Maximum Pixel Neighbor Distance Value function is performed. FIG. 9 provides a detailed description of method 4. In method 5, Pixel Neighbor Repetitive Averaging function is performed. A detailed description of method 5 is provided in FIG. 10.

Figure 3:
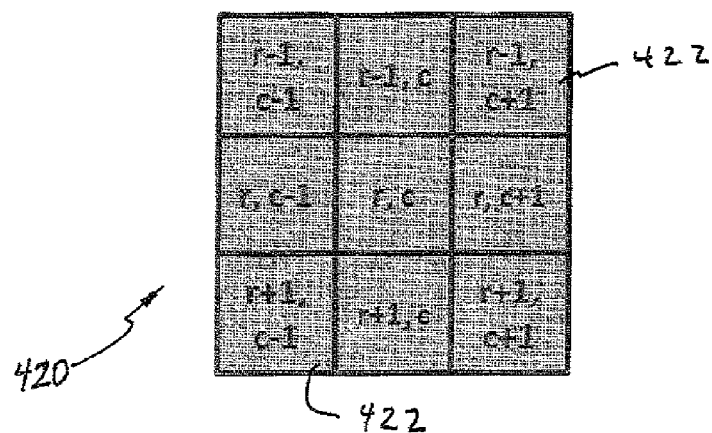
FIG. 3 is an image depicting the pixel labeling convention for a 2D array which contains 3D point cloud data.

Referring to FIG. 3 an image is shown depicting the pixel labeling convention 420 for a 2D array which contains 3D point cloud data in the program. This convention utilizes row and column indices 422 to label a pixel giving it an address specific to one specific pixel in a scan file. This address allows for identification of the pixel within the scan file and comparison of pixels at the same address in multiple scan files.

Figure 4:
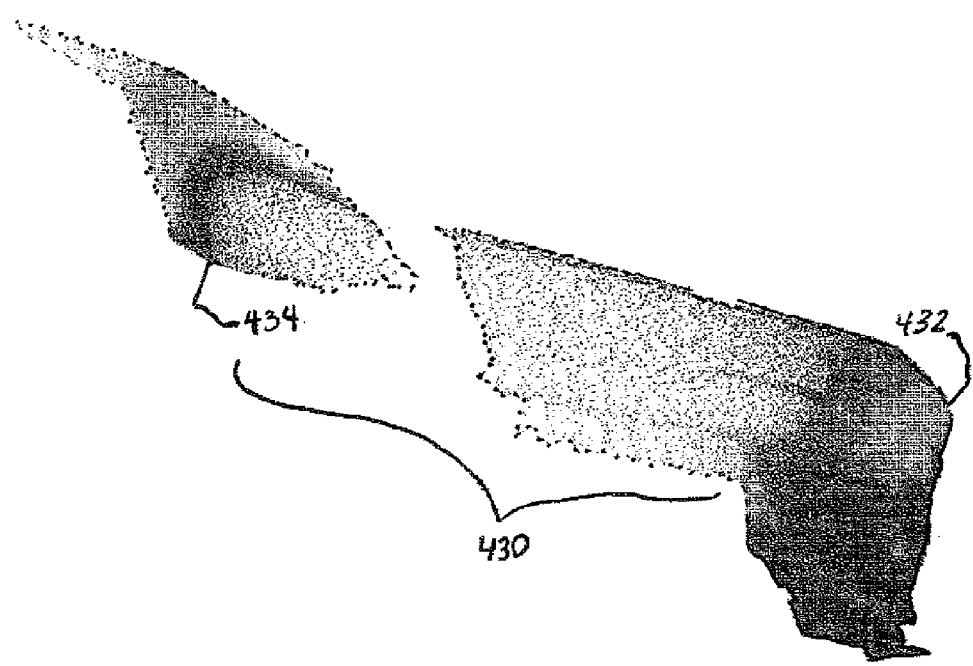
FIG. 4 is an unedited point cloud of a statue head in original scan file form.

Referring to FIG. 4, an unedited point cloud of a statue head 432 is shown in original scan file form. A substantial amount of scatter points 430 are visible between the head 432 of the statue and the wall 434 behind it. As with other physical measurement systems, all data collected is subject to statistical noise. This amount of noise observed as scatter points is typical of 3D laser scans resulting in unclear edge between the statue and the background of the image.

Figure 5:
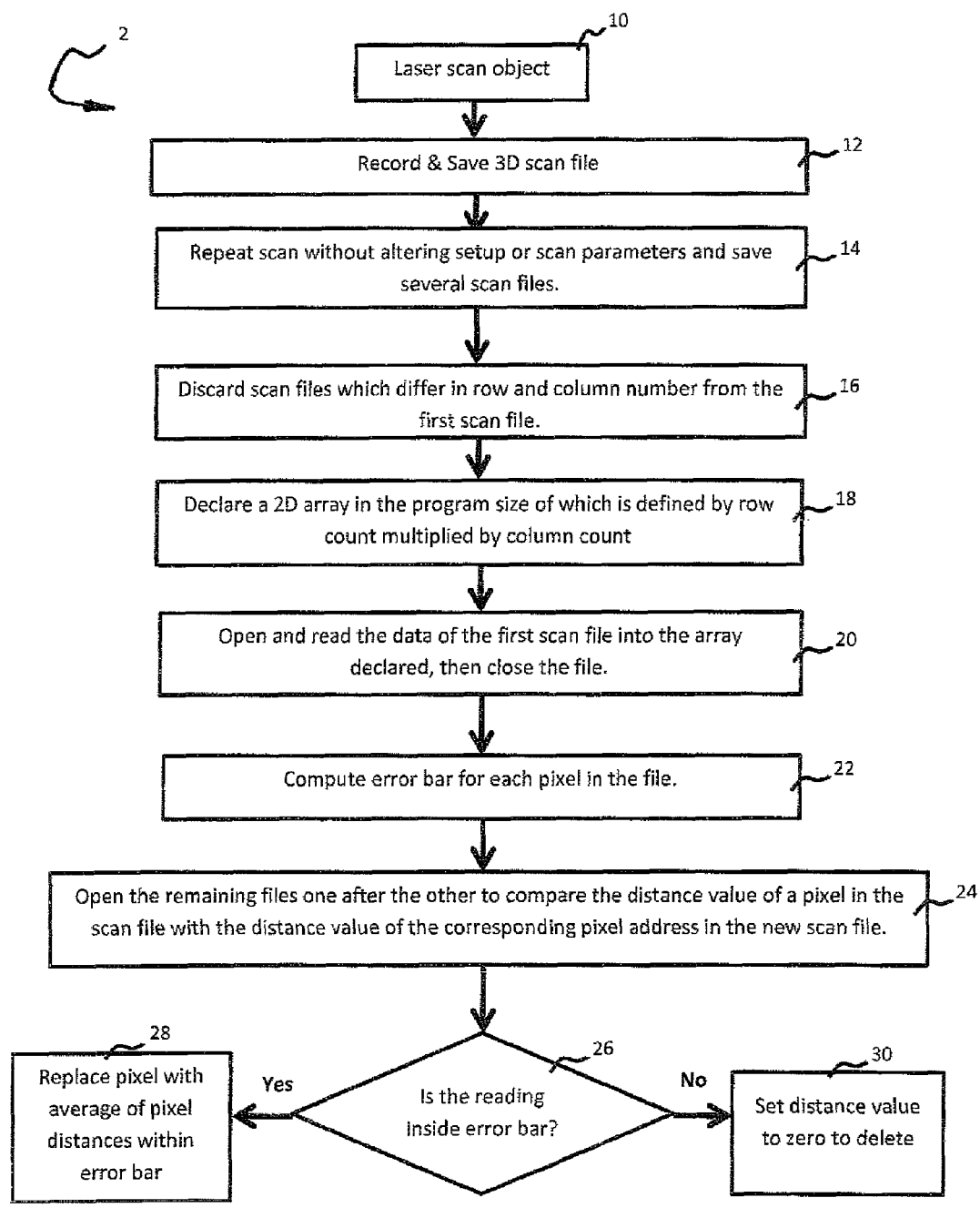
FIG. 5 is a flow chart depicting the method of the Delete Scatter Points Option 1: Comparison of distance values across multiple scan files.

Referring to FIG. 5, a flow chart is shown explaining step 2 Delete Scatter Points Option 1: Comparison across multiple scan files. Step 2 deletion of scatter points should be utilized if many scan files are available because the comparison of many scan files creates more certainty as to which points are scatter points and which are not through the fluctuation of distance value measured across multiple scan files. An object is scanned by a 3D laser scanner at step 10. If the file is not already read in polar coordinates, the file must be converted to polar coordinates. The file containing polar coordinates is then recorded and saved as a 3D scan file at step 12. At step 14, the 3D scan is performed multiple times without altering the scan arrangement or scan parameters and these files are saved if the row and column number is equal to the row and column number from the scan file obtained in step 10. If the row and column number differs, at step 16 the scan should be discarded. Ideally 8 or more scan files of the same size should be obtained for accurate comparison.

Once an adequate number of scan files have been obtained, at step 18, a 2D array is declared in the program, size of which is defined by row count multiplied by column count. At step 20, the data from the first scan file obtained in steps 10 and 12 is read into the array declared and the file is closed. The error bar is computed at step 22 for each pixel within the file.

The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function"Error functions, at its simplest, can be a percentage of the measured distance, a linear function, piecewise linear or be more complex function. Error function must be conservative and return maximum noise margin for the distance and surface color input. The resultant error function is then hard coded in the software.

At step 24, the remaining files are opened one after the other and the distance value of each pixel is read to determine whether the difference between the pixel distance value and the new file corresponding pixel address distance lies within the estimated error bar at step 26. At step 28, replace the distance value with the average of those pixel distance values that lie within the error bar. If the difference between the pixel value distance reading and the new file distance value is outside of the error bar, the distance value of the pixel should be deleted by setting the value equal to zero.

Figure 6:
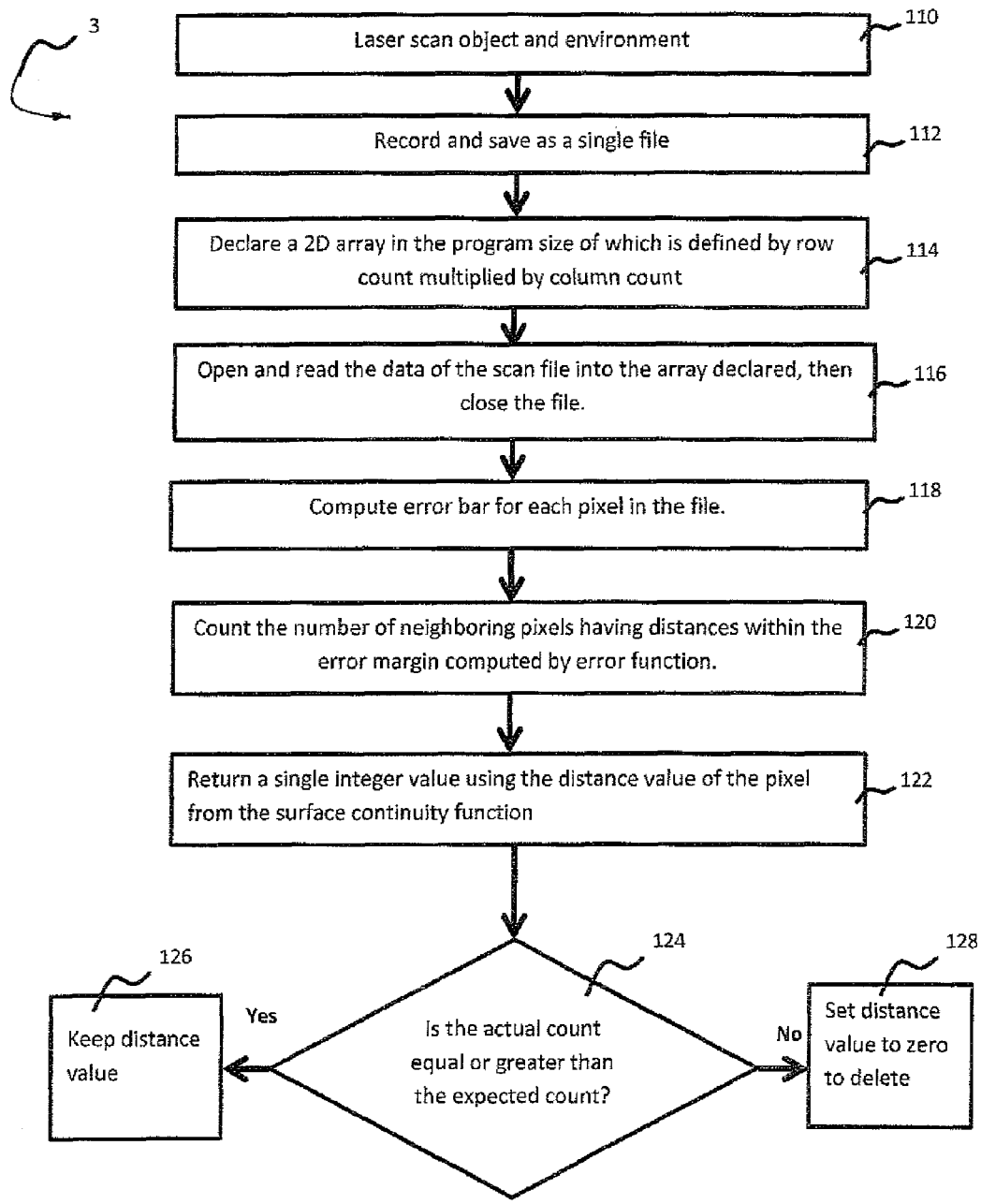
FIG. 6 is a flow chart depicting the method Delete Scatter Points Option 2: Surface continuity analysis.

FIG. 6 is a flow chart depicting the method Delete Scatter Points Option 2: Surface continuity analysis. Surface continuity analysis is used in order to distinguish scatter points from points that make up actual scanned body or surface and this is determined by the count that must be satisfied of neighboring pixel distances for which their distance values lies within the error bar of the center pixel for the point to not be considered a scatter point.

The surface continuity function, which returns this integer threshold i.e. between 1 and 8 (minimum and maximum count of neighboring pixels), must be found through experimentation and hard coded in software. The surface continuity function output which is utilized in step 3 is determined from the distance values and surface color stored in the 2D array. Step 3 deletion of scatter points does not require additional sets of scan data to be compared.

At step 110, an object and the environment is scanned by a 3D laser scanner. If the file is not already read in polar coordinates, the file must be converted to polar coordinates. The file containing polar coordinates is then recorded and saved as a 3D scan file at step 112. At step 114, a 2D array is declared in the program, size of which is defined by row count multiplied by column count. At step 116, the data from the first scan file obtained in steps 110 and 112 is read into the array declared and the file is closed. The error bar is computed at step 118 for each pixel within the file. The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function". Surface continuity function and error function are complementary functions. For example, for a large distance between the scanner and the object scanned, larger errors can be expected; however, if a large enough error bar has not been determined by the error function, then surface continuity function can offset by lowering the threshold for the number of neighboring distances expected to be within the error bar of the center pixel.

At step 120 count the number of neighboring points having distances within the error margin computed by error function 118. At step 122 return a single integer value for the surface continuity threshold number using the distance and color value of the pixel from the surface continuity function. At step 124 determine if the actual count of the pixels from 122 is greater than or equal to the expected count. If the actual number is greater than or equal to the expected count, the distance value remains unchanged in step 126. At step 128, if the actual count of the pixels is less than the expected count, the pixel distance value is deleted by setting the value to zero.

Figure 7:
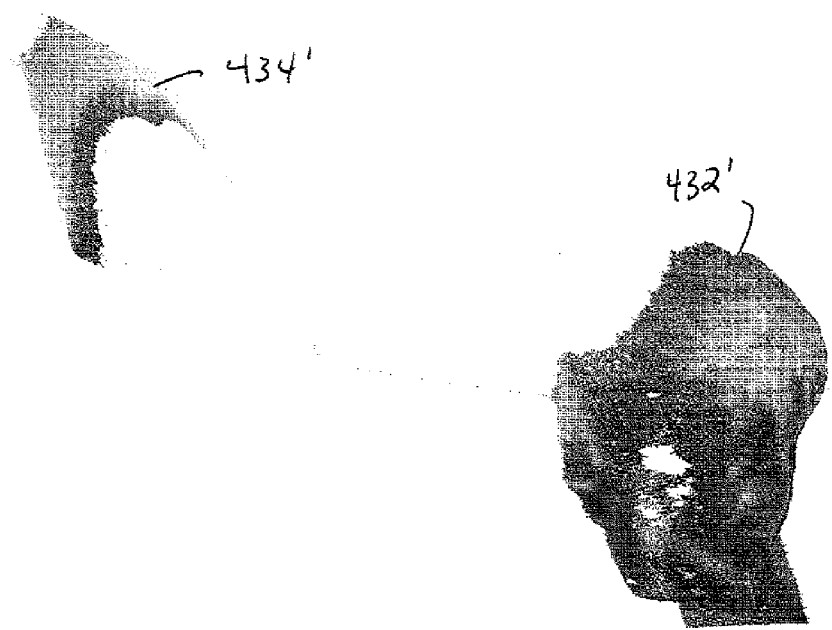
FIG. 7 is an edited point cloud of a statue with Delete Scatter Points Options 1 or 2 applied.

Referring to FIG. 7, an edited point cloud of a statue head 432' is shown after scatter points have been deleted in steps 2 and steps 3. When viewed in comparison to FIG. 4, the significant deletion of scatter points can be viewed in the center of the image between the statue head 432' and the wall 434' as the true surface of the figure has been determined and the scatter points deleted.

Figure 8:
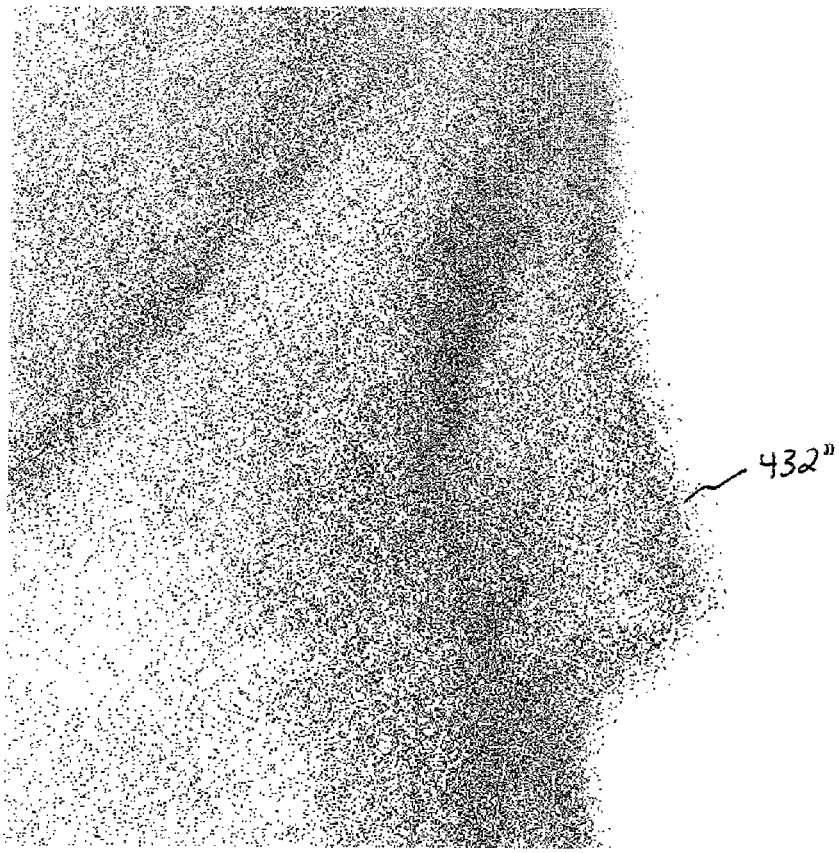
FIG. 8 is and unedited close-up view of a statue nose in original scan file form.

Referring to FIG. 8, an unedited point cloud of a close-up view of a statue nose 432" in original scan file form is shown. The amount of surface roughness observed is typical of 3D laser scans. The amount of surface roughness visible causes a blurred image, inhibits precise measurements from being taken, and in-depth analyses from being executed to a high degree of certainty because of the high error involved. For example, small degrees of change over time of a surface being measured cannot be observed or quantified to a high degree of certainty with a large amount of statistical surface noise present which prevents the capabilities of the 3D laser scanner from being utilized to its fullest extent.

Referring to FIG. 9, a flow chart is shown depicting in detail step 4 Compression of Minimum and Maximum Pixel Neighbor Distance Value. At step 230, the software determines whether the scatter points have been deleted by step 2 Option 1, step 3 Option 2, or both steps prior to moving forward with step 4. At step 232, for each odd number pixel address within the 2D scan data array, calculate the error bar for the measured distance value. Once the odd number pixel address error bar has been determined, complete the same for the even numbered addresses. The error bar is computed at step 232 for each pixel within the file. The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function". At step 234, the maximum and minimum neighboring pixel distance values are determined, excluding array border points, and the difference is found between the two values. Whether the difference between the minimum and maximum values from step 234 is within error bars 232 is determined in step 236. If value 234 is within error bar 232, replace the minimum and maximum neighboring pixel distance with the mean of the minimum and maximum distance value in step 238. If value 234 is outside of error bar 232, the pixel is not altered.

Figure 10:
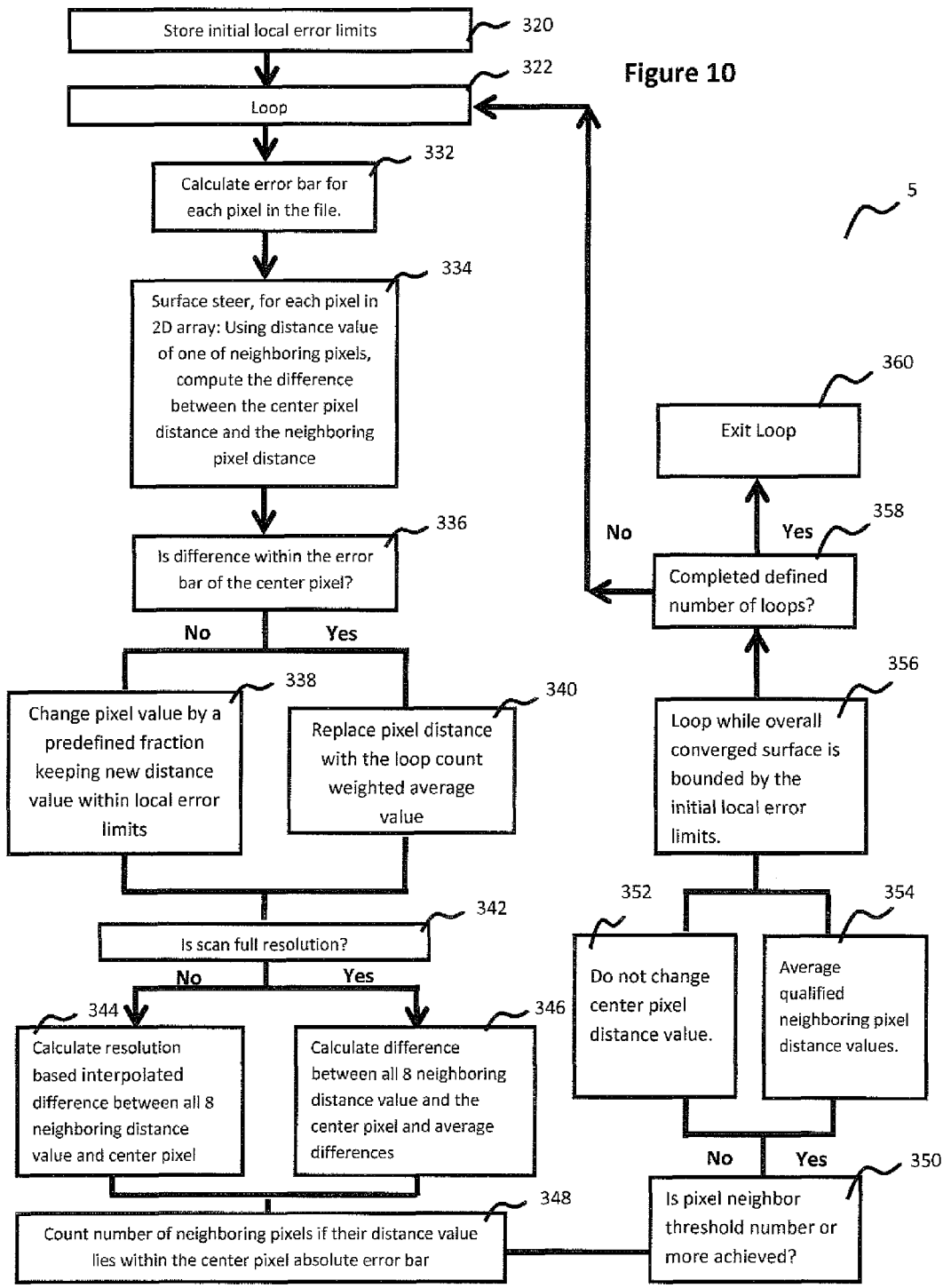
FIG. 10 is a flow chart depicting in detail the Pixel Neighbor Repetitive Averaging method.

Referring to FIG. 10, a flow chart is shown depicting in detail step 5, the inventive Pixel Neighbor Repetitive Averaging method, which may be implemented on a computer, such as a personal computer of usual design. Such personal computer is programmed with software for receiving point cloud data and performing the point cloud data processing steps described hereinabove and herein below, with the output processed point cloud data sent, for example, to a monitor for display, a file for storage or a printer. This method achieves the noise free/smooth point cloud surface feel and can be used to process a point cloud data set with or without scatter points removed. However, using a point cloud data set with scatter points deleted (for example by either the Option 1 or Option 2 delete scatter point methods) achieves superior results. Pixel Neighbor Repetitive Averaging is so named herein because the technique is an iterative process of averaging certain number of neighboring pixel distance values and replacing the new averaged distance value with the center pixel distance value for each scan points in a 2D point cloud array. As the iterations, or loop count increases the noisy point cloud tends to a noise free state. Pixel Neighbor Repetitive Averaging Method queries the tendency of forming noise free point cloud surface between each loop and steers the smoothening surface, making sure it is always bounded by the initial noisy point cloud local minimum and maximum error limits. Steps 332, 334, 336, 338 and 340 refer to "surface steer" technique, and steps 342, 344, 346, 348, 350, 352 and 354 refer to "averaging of neighbour pixel distance values" technique of Pixel Neighbor Repetitive Averaging.

In step 320, local error limits are calculated, either in the raw scan file state or with scatter points deleted and "Compression of Minimum and Maximum Pixel Neighbor Distance Value" function applied and stored for each pixel. Having this information informs the software optimum smoothing achieved and steer required during the formation of smooth point cloud surface. Local error limits are maximum and minimum noise observed in either immediate neighbouring points (8 points) or second order neighbouring points (8 neighboring points+16 points adjacent the neighboring points) or may be higher order neighbouring points.

Step 322 is beginning point of each loop.

In step 332 the error bars or uncertainty in measured distance is returned from an error function for each point. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function".

In step 334, for each pixel in the point cloud array, use the distance from one of the neighboring pixels in sequence and compute the difference between the center pixel distance and neighboring pixel. For each loop, neighbour pixels can be used in sequence. Alternatively, a test criterion can be adapted in choosing most suitable neighboring pixel distance, such as finding the neighboring pixel whose distance value is closest to the midpoint of local error limits of Step 320.

At step 336, one determines if the difference is within error bar calculated at step 332. If the answer to step 336 is "no" then at step 338, one changes the distance value for the pixel by a predefined fraction whilst keeping the new distance value within the range defined by the original distance value for the pixel plus or minus the error bar. At step 338, the pixel distance value can be changed by adding or subtracting a small fraction of the pixel distance value to itself. For example, if the measured distance value is X meters then the distance value can be changed by a small fraction, say 0.001% {or X (+/−) (X*0.00001)}. The addition or subtraction of a small fraction of the pixel distance value to itself depends on the behaviour or the formation of the smooth surface between each loop, such that smooth surface position always remain within the local error limits of step 320.

If the answer to step 336 is yes, one replaces the pixel distance with the loop count weighted average value at step 340. The weighted average may be determined by the following formula: new distance value=((Current_distance_value*loop_count)+Changed_distance_value)/(loop_count+1). The steering of the smoothening surface with the weighted values of step 340 emphasizes the developing surface trajectory.

At step 342, one determines the scan resolution which is set as a main scan parameter prior to the collection of the scan. The frame size of all scans is the same if the field of view parameter remains the same; however, the density of the point cloud within the frame size varies based on resolution. If a high resolution scan is recorded, one can more freely average the points because the points are closer together and will be moved by smaller increments. If the scan is of a lower resolution, the points are further apart and one cannot be as sure whether the points are noise or part of the intended image. The points are further apart in a low resolution scanner because the scanner has moved a larger angle or distance before firing the next laser beam. Scanners typically have eight to ten resolution settings such as Full 1, Half ½, Quarter ¼, and so on. Because averaging can have different effects based on scan resolution, the inventive method ideally factors in the resolution when an average is found between neighboring points so as not to over or under smooth the image.

If the scan is not scanned at highest resolution, at step 344, calculate the resolution based interpolated distance differences between the center pixel distance value and the distance values of its eight neighboring pixels, such as by a linear, cubic spline or similar function. For example, if the scan resolution is half and the difference between the center pixel distance and one of its neighboring pixel distances X millimeters, then by linear interpolation, the difference can be taken as X/2 millimeters. If the scan is full resolution, at step 346, calculate the difference between all eight neighboring distance values and the center pixel and determine the average of the differences.

At step 348, count the number of neighboring pixels if their distance value lies within the error bar, which is calculated by the error function, of the center pixel.

At step 350, the actual count of step 348 is checked against a threshold "count".

The "count" is returned from Pixel Neighbor Count Function. Pixel Neighbor Count Function is a function of distance, object surface color, scan resolution and laser beam angle of incidence and evaluated by experimentation and then hard coded in the software. Typically threshold count (threshold integer value of Pixel Neighbor Count Function) returned is between 4 and 8.

At step 352, if the actual count of step 348 is less than the threshold integer value of Pixel Neighbor Count Function then the centre pixel distance value remains unchanged. On the other hand, if the actual count is greater than the threshold count returned by the Pixel Neighbor Count Function, at step 354 the software averages the counted distance values (those values within the range defined by the original distance value for the pixel plus or minus the error bar) of step 348 and update the centre pixel distance value with the new average value. Hence, Pixel Neighbour Averaging moves the centre pixel distance value by a small incremental distance towards an equilibrium state, or the smooth surface state. In the inventive Pixel Neighbor Repetitive Averaging technique no points are deleted.

Careful evaluation of the Pixel Neighbor Count Function is important. If unusually low threshold count is returned by the Pixel Neighbor Count Function then pixels are encouraged to move more frequently. This may in turn have an adverse effect in the formation of a smooth surface such as a ripple effect on the smooth surface between the localized maximum and minimum error limits of step 320 as viewed in the double line of FIG. 12. It is observed being selective and moving fewer points (high threshold count returned by the Pixel Neighbor Count Function) in each loop and using higher number of loop count (overall scan point's movement) yield best results. In simple applications Pixel Neighbor Count Function can be constant.

By step 356, the two functionalities of Pixel Neighbor Repetitive Averaging, i.e. Surface Steer and Pixel Neighbor Averaging are completed for each loop. At step 356, loop count is left open ended, and looping continues provided the trajectory of the smooth surface taking shape remains within the local error limits determined at step 320. If the forming smooth surface trajectory crosses the local error limits then loop exit flag is raised and the final value for the distance for that pixel has been determined by the system software.

Alternatively, at step 358, the number of loops required may be predetermined and hard coded in the software. Still another possibility is to define a maximum number of loops from the scan resolution.

If the defined number of loops has not been completed (whether it is a predetermined fixed number or defined as detailed above), the software begins the loop again at step 322. If the defined number of loops has been completed, exit loop at 360. Looping can be forced to abandon in step 358 if exit flag is raised in step 356.

Loop count is also important in this software so that the surface is not under smoothened. Higher resolution scans typically utilize higher loop counts because noise levels can be higher.

As a guide for step 358, fixed number of loop count, half resolution scans, which are obtained be twice the pan and tilt angle increment of the scanner head, typically would need half the loop count required by full resolution scan to smooth the surface.

Figure 11:
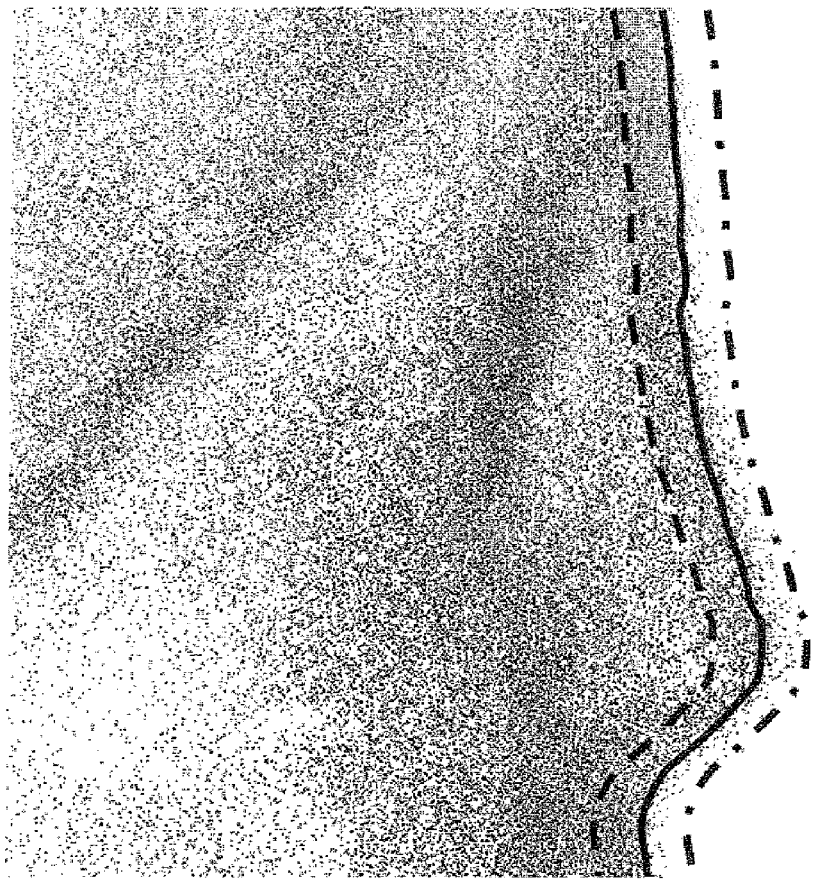
FIG. 11 is an image depicting the maximum and minimum limits of the Pixel Neighbor Repetitive Averaging method imposed on a statue nose.

Referring to FIG. 11, an image is shown of a statue nose illustrating the Pixel Neighbor Repetitive Averaging method with a correct loop count and correct surface steer. The noise smoothing minimum error bar limit is represented by the dash-dot-dash line. The noise smoothing maximum error bar limit is represented by the dashed line. These maximum and minimum error limits are equal to the error bars determined and stored from the error function prior to the software employing the smoothing method. The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function". For a fixed optimal loop count or for open ended loop count where noisy surface is allowed to form by correct steering within the local error margins the solid line noise free surface trajectory is achieved using the Pixel Neighbor Repetitive Averaging method.

Referring to FIG. 12, an image is shown of a statue nose illustrating the Pixel Neighbor Repetitive Averaging method with an incorrect loop count or in correct surface steer. The noise smoothing minimum error bar limit is represented by the dash-dot-dash line. The noise smoothing maximum error bar limit is represented by the dashed line. The solid line represents the over smoothed surface if an adequate loop count is not determined and the software is allowed to run without using these error bar limits. The double line shows a ripple effect if a low count threshold number is returned by the Pixel Neighbor Count Function.

Referring to FIG. 13, an edited point cloud of a close-up of a statue nose with the Scatter Points Deletion steps 2 and 3, the Compression of Minimum and Maximum Pixel Neighbor Distance Value step 4, and Pixel Neighbor Repetitive Averaging step 5 applied.

Below is the code for implementing the inventive method. There are three primary functions which are executed in the code below, which are the three main operations described above.

While illustrative embodiments of the invention have been described, it is noted that various modifications will be apparent to those of ordinary skill in the art in view of the above description and drawings. Such modifications are within the scope of the invention which is limited and defined only by the following claims.

What is claimed:

1. A method for processing an array of pixels in a point cloud, comprising:
   (a) calculating local error limits for each distance value for each pixel in the processed point cloud data set;
   (b) determining the error bar;
   (c) beginning a distance value adjusting loop by for each pixel in the processed point cloud data set by calculating the difference between the distance value in the pixel of the point cloud data set being processed and each of the neighboring pixels or the most suitable neighboring pixel distance value;
   (d) determining whether the difference is within the range defined by the error bar;
   (e) if the difference is not within the error bar, changing the distance value for the pixel being processed by a small fraction while keeping the new distance value within the range defined by the original distance value for the pixel being processed plus or minus the error bar;
   (f) if the difference is within the error bar the distance value in the pixel being processed is replaced by a weighted average value;
   (g) count the number of neighboring pixels with their distance values within the error bar for the pixel being processed and if the count is greater than a predetermined threshold, average the counted distance values and substitute the average for the pixel distance value, but if the count is below the threshold leave the pixel distance value unchanged; and
   (h) determining whether loop exit criteria have been met and if loop exit criteria have not been met beginning the loop again, and if loop exit criteria have been met, terminating the loop.

2. A method as in claim 1, further comprising calculating resolution.

3. A method as in claim 1, wherein said calculating local error limits for each distance value for each pixel in the processed point cloud data set is done by observing the maximum and minimum values observed in the eight intermediate neighboring pixels.

4. A method as in claim 1, wherein said calculating local error limits for each distance value for each pixel in the processed point cloud data set is done by observing the maximum and minimum values observed in the eight intermediate neighboring pixels and the 16 second-order neighboring pixels, such calculation of local error limits being calculated where the requisite number of intermediate neighboring pixels exist.

5. A method as in claim 1, wherein distance values are processed only where the requisite number of intermediate neighboring pixels exist.

6. A method as in claim 1, wherein the weighted average value is calculated using the formula:

$$\text{new distance value} = ((\text{Current\_distance\_value} * \text{loop\_count}) + \text{Changed\_distance\_value}) / (\text{loop\_count} + 1).$$

7. A method as in claim 1, wherein the processed point cloud data set is generated by a method comprising:
   (i) performing a first scanning of a surface of an object or a portion thereof with a light source;
   (j) collecting first light reflected by the surface in response to the first scanning and converting the first light reflected by the surface into a first scan file of matrices of data points representing point position measurements and saving as a first scan file;
   (k) performing additional surface scanning and light collection to generate a plurality of additional matrices of additional data points representing additional point position measurements, and saving said matrices as additional three dimensional scan files, said first three dimensional scan file and said additional three dimensional scan files, comprising a generated set of scan files;
   (l) optionally selecting some of all of said generated set of scan files to form a selected set of scan files;
   (m) determining a template for receiving the matrices of data points corresponding to said selected set of scan files; where such pixel labeling convention is row multiplied by column
   (n) loading said first three dimensional scan file into the template to form a first data array;
   (o) computing an error bar for each of the pixels in the first data array;
   (p) comparing each additional data point to the corresponding point in said first data array to generate a corresponding difference value;
   (q) replacing each additional data point, associated with a difference value within its respective error bar, with the average of all data points within the respective error bar, and discarding other data points to generate a processed data array.

8. A method as in claim 1, wherein the processed point cloud data set is generated by a method comprising:
(i) performing a first scanning of a surface of an object or a portion thereof with a light source; laser;
(j) collecting first light reflected by the surface in response to the first scanning and converting the first light reflected by the surface into a first scan file of matrices of data points representing point position measurements and saving as a first three dimensional scan file;
(k) computing an error bar for each of the pixels in the processed data array;
(l) for each pixel in the processed data array, counting the number of surrounding pixels having values within the error bar;
(m) for each pixel in the processed data array, retaining those pixels having a minimum number of surrounding pixels having values within the error bar and discarding pixels not having a minimum number of surrounding pixels having values within the error bar to generate a twice processed data array
(n) calculating the error bar for the intermediate processed data set;
(o) for each pixel in the intermediate processed data set, calculating the difference between the pixel value and either a corresponding pixel in another data set or an adjacent pixel in the three times processed data set; and
(p) if the difference is within the error bar for the intermediate processed data set, replacing pixel distance.

9. A method as in claim 1, wherein the processed point cloud data set is generated by a method comprising:
(i) performing a first scanning of a surface of an object or a portion thereof with a light source; laser;
(j) collecting first light reflected by the surface in response to the first scanning and converting the first light reflected by the surface into a first scan file of matrices of data points representing point position measurements and saving as a first three dimensional scan file;
(k) for a plurality of pixels in the processed data array, determine the maximum and minimum values in the surrounding set of neighboring pixels;
(l) for each of said plurality of pixels in the processed data array, compute an error bar;
(m) for each of said plurality of pixels in the processed data array determine the difference between the maximum and minimum values of surrounding neighboring pixels; and
(n) if the difference between the maximum and minimum values of surrounding neighboring pixels is smaller than the difference between the maximum and minimum values of surrounding neighboring pixels, store the average value of the maximum and minimum values, otherwise retain the original value of the pixel, to generate an intermediate processed data set.

10. A method as in claim 1, wherein the loop exit criteria is determined by a fixed number of loops.

11. A method as in claim 1, wherein the loop exit criteria is deviation outside of the range defined between upper and lower distance value limits.

* * * * *